United States Patent [19]
Johnson

[11] Patent Number: 5,349,406
[45] Date of Patent: Sep. 20, 1994

[54] CAMERA AND METHOD FOR BYPASSING FOGGED PHOTOGRAPHIC FILM

[75] Inventor: Glenn W. Johnson, Rochester, N.Y.

[73] Assignee: Eastman Kodak Company, Rochester, N.Y.

[21] Appl. No.: 18,626

[22] Filed: Feb. 17, 1993

[51] Int. Cl.[5] .............................. G03B 1/18
[52] U.S. Cl. ................. 354/173.1; 354/212; 354/217; 354/218
[58] Field of Search ............... 354/212, 214, 215, 217, 354/218, 173.1

[56] References Cited

U.S. PATENT DOCUMENTS

| 4,281,911 | 8/1981 | Engelsmann et al. | 354/218 |
| 4,362,370 | 12/1982 | Iwata et al. | 354/217 |
| 4,455,074 | 6/1984 | Wong et al. | 354/214 |
| 4,676,621 | 6/1987 | Desormeaux | 354/173.1 |
| 4,687,311 | 8/1987 | Desormeaux | 354/217 |
| 4,896,180 | 1/1990 | Lawther | 354/215 |
| 4,982,212 | 1/1991 | Alyfuku | 354/214 |

*Primary Examiner*—Monroe H. Hayes
*Attorney, Agent, or Firm*—Francis H. Boos

[57] ABSTRACT

A method of bypassing film that is inadvertently fogged in a pre-wind camera includes detecting the opening of the camera back, storing the frame number corresponding to the opening of the camera back, determining which frames are fogged, and bypassing these fogged frames during the normal operation of the camera. A camera in accordance with the invention also can take into consideration the ambient light level, the film speed, and the length of time the door was open, and then select the appropriate number of frames to be advanced from a look-up table in order to bypass the fogged frames.

14 Claims, 5 Drawing Sheets

CAMERA AND METHOD FOR BYPASSING FOGGED PHOTOGRAPHIC FILM

BACKGROUND OF THE INVENTION

1. Field of the Invention

This invention relates generally to photographic cameras and, more particularly, to cameras that include a film drive system for moving a photographic filmstrip within the camera.

2. Description of the Related Art

In conventional-wind cameras, a light-tight film canister containing a photographic filmstrip is placed in a recess of the camera for loading. The end of the filmstrip extending from the canister is pulled across an exposure gate and coupled to a take-up spool. After loading, the filmstrip is intermittently extracted from the canister and is wound onto the take-up spool as the photographer uses frames of the filmstrip by completing exposures. The filmstrip extracted from the canister is protected from ambient light by a camera back door and associated encasements.

If the camera back door is opened in mid-roll, the used frames on at least the outer-most wraps of film on the take-up spool will be ruined. Opening the back door permits ambient light to strike the filmstrip and fog at least the outermost wraps of the filmstrip on the take-up spool. The actual number of frames ruined will vary, depending on the amount of ambient light, the amount of time the camera back was open, and the light sensitivity of the filmstrip.

To prevent ruining used filmstrip frames due to accidental openings of camera backs, cameras have been provided with a pre-wind feature. Pre-wind cameras include a motorized film transport mechanism that winds substantially all of the filmstrip onto the take-up spool before any frames are exposed. After the filmstrip is wound onto the take-up spool, the filmstrip is intermittently wound back into the light-tight film canister by one frame length as each frame is exposed. Thus, in a pre-wind camera, the exposed frames are protected within the film canister if the camera back is opened in mid-roll, with the possible exception of the exposed frame typically located between the camera exposure gate and the film canister.

Some pre-wind cameras respond to opening of the camera back in mid-roll by automatically setting the camera frame counter to zero and continuously rewinding the filmstrip back into the film canister. U.S. Pat. No. 4,676,621 to Molloy-Desormeaux, for example, describes a pre-wind camera that responds to the opening of the camera back in mid-roll by automatically initializing the frame counter and continuously rewinding the remaining unused filmstrip back into the film canister until a sensor indicates that film is no longer on the take-up spool. This system is said to ensure that the film transport mechanism will not be prematurely halted before the used frames of the filmstrip are completely wound back into the canister.

The pre-wind camera described in U.S. Pat. No. 4,687,311 to Molloy-Desormeaux does not change the frame counter if the camera back is opened in mid-roll but does rewind the filmstrip back into the canister. Unfortunately, the camera does not assist the user in accurately assessing the number of frames likely to have been fogged and therefore the user would not be inclined to try to use any remaining unfogged/unexposed film. The camera user would have to re-load the filmstrip onto the take-up spool to begin picture taking, rewind the appropriate number of frames back into the film canister and trip the shutter button with the back closed and the objective lens covered to move the film to the point at which the camera back was opened, and then rewind the filmstrip by an appropriate number of additional frames until the fogged frames are bypassed.

Occasionally, a camera user will accidentally open the camera back during the pre-winding operation when the filmstrip is being wound onto the take-up spool. Unfortunately, pre-wind cameras typically are not directed to respond to an instance of opening a camera back during the pre-wind operation. It can be very difficult for a camera user to estimate the frame number when the camera back was opened, estimate the number of frames fogged, and advance the filmstrip to the appropriate location to bypass the fogged frames.

From the discussion above, it should be apparent that there is a need for a camera that can detect the opening of the camera back, determine the appropriate number of filmstrip frames likely to have been fogged, and automatically skip the appropriate number of frames, thus saving a good portion of a filmstrip that otherwise might have been discarded, without requiring intervention on the part of the photographer. The present invention satisfies this need.

SUMMARY OF THE INVENTION

The present invention provides a method and apparatus for automatically bypassing frames of a filmstrip that have been fogged due to opening of the camera back. In accordance with the invention, a camera responds to opening of the camera back in mid-roll by automatically determining the number of frames likely to have been fogged by the opening of the camera back and skipping those frames to position the filmstrip at an unused, unfogged position. In one aspect of the invention, a pre-wind camera responds to opening of the camera back in mid-roll by rewinding the filmstrip from the take-up spool into the film canister by a predetermined number of frames so that the filmstrip is positioned with a non-fogged frame at the exposure gate.

In another aspect of the invention, a pre-wind camera first detects the filmstrip position when the camera back is opened and closed during the pre-wind operation, stores data concerning the frame number when the back is opened and then closed, retrieves data concerning the number of frames likely to have been fogged when the camera back was opened, and completes the pre-wind mode. After the pre-wind mode has been completed and the picture taking mode has begun, the camera detects when the stored data indicates that the next frame to be exposed is one of the frames fogged, advances the film a predetermined number of frames beyond the fogged frame, and then permits the next exposure to be completed.

The number of frames fogged when the camera back is opened varies according to the amount of time the camera back is left open, the ambient light conditions, the film travel speed (if any), and the sensitivity of the film to light. Accordingly, a camera in accordance with the present invention can include the ability to adjust the number of frames to be skipped depending on one or more of these parameters. In this way, the number of frames skipped is maintained as closely as possible to the minimum likely number of frames actually fogged and the number of frames saved for use is increased. This minimizes waste of film.

Other features and advantages of the present invention should be apparent from the following description of the preferred embodiments, which illustrate, by way of example, the principles of the invention.

DESCRIPTION OF THE PREFERRED EMBODIMENTS

Figure 1:
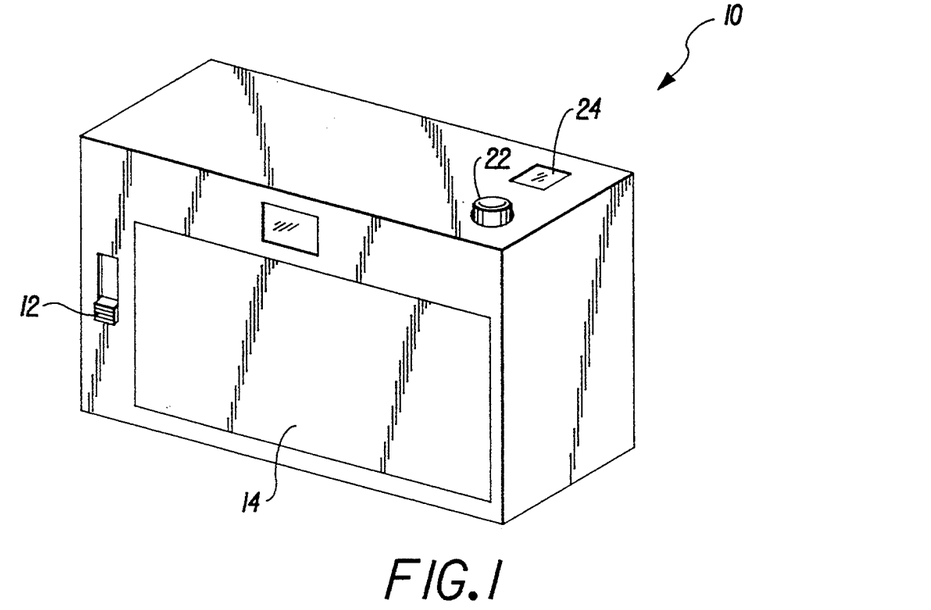
FIG. 1 is a perspective view of a camera constructed in accordance with the present invention.
Figure 2:
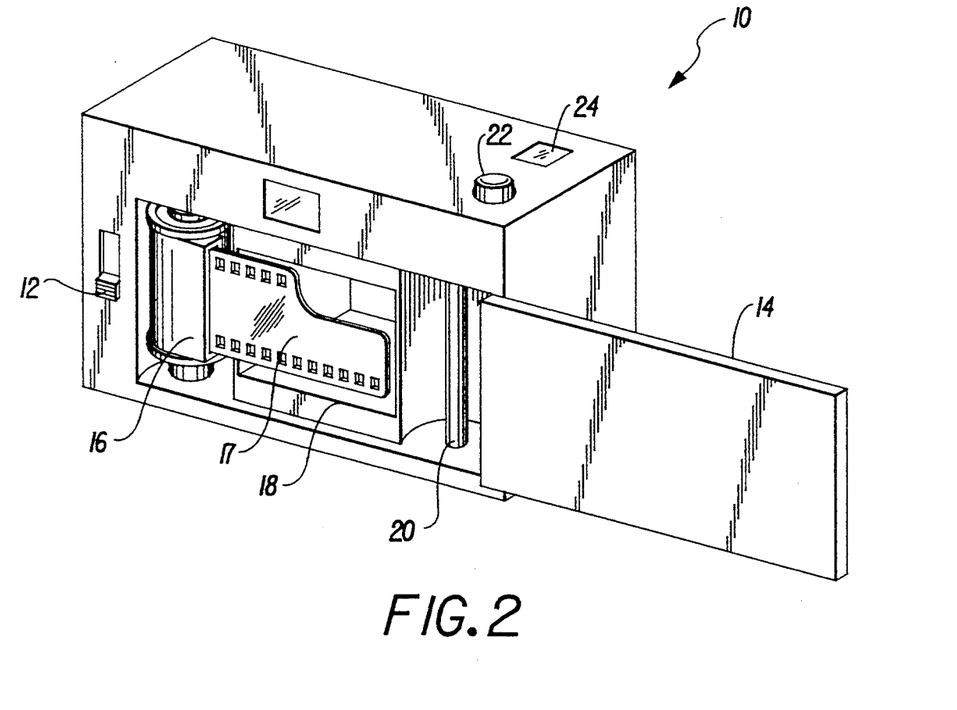
FIG. 2 is a perspective view of the camera illustrated in FIG. 1 with the camera back opened.

With reference to FIGS. 1 and 2, a pre-wind camera 10 constructed in accordance with the present invention includes a latch 12 that is used to open the camera back 14 and load a light-tight film canister 16 containing a photographic filmstrip 17. The filmstrip is loaded by being pulled across an exposure gate 18 and coupled to a take-up spool 20. During the mode of operation referred to as pre-wind, the camera 10 winds the filmstrip onto the take-up spool and counts the frames until the end of the filmstrip is reached, whereupon the camera begins a picture-taking mode. During the picture-taking mode, the film is wound back into the canister 16 frame-by-frame as the photographer presses the shutter button 22 and completes exposures.

If the camera back 14 is opened in mid-roll during the picture-taking mode, thereby exposing a portion of the filmstrip 17 to ambient light and fogging a number of unused frames, then the camera 10 will retrieve from memory a number that corresponds to the likely number of frames fogged and will rewind that number of frames back into the film canister 16. The filmstrip 17 is therefore left at a position with an unfogged frame at the exposure gate 18, ready for completing the next exposure.

If the camera back 14 is opened during the pre-wind mode, thereby fogging a number of frames of the filmstrip, then the camera 10 will halt the winding of the filmstrip onto the take-up spool until the camera back is closed, store data concerning the frame count at camera back opening and at closure, complete the pre-wind mode, and automatically advance the film past the fogged frames during the picture-taking mode when the camera detects that the next frame to be exposed is one of the fogged frames. In this way, the fogged frames are automatically skipped without intervention by the photographer, thus saving film that otherwise might be discarded and preventing exposures from being made onto fogged frames of film.

As the filmstrip 17 is wound onto the take-up spool 20 during the pre-wind mode, the frame count is displayed in a frame counter 24 of the camera 10. If the camera back 14 is opened during the pre-wind mode, the data that is stored by the camera 10 concerning the frame count corresponds to the frame count at the time the camera back was opened. The exact number or data that is stored can be varied, for example, depending on the correspondence between the frame count when the camera back was opened and the count when the camera back was closed, but at least should indicate the first frame of the fogged frames that would be encountered when exposures are being completed during the picture-taking mode.

Thus, if the camera back 14 was opened during the pre-wind mode, then the camera 10 first will complete the pre-wind operation and thereafter, during the picture-taking mode, will skip the appropriate number of frames. In particular, after each exposure is completed, if the frame count indicates that the next frame to be exposed at the exposure gate 18 corresponds to one of the frames likely to have been fogged when the camera back 14 was opened, then the camera 10 moves the film a predetermined number of frames into the film canister 16. The predetermined number of frames preferably corresponds to the approximate number of frames likely to have been fogged by the opening of the camera back and can be selected as described further below. In this way, each opening of the camera back will result in one skipping operation.

If the camera back 14 is opened during the picture-taking mode, then the camera 10 immediately advances the filmstrip 17 into the film canister 16 by a predetermined number of frames. Again, the predetermined number of frames is selected to correspond to the approximate number of frames likely to have been fogged by the opening of the camera back and can be selected as described further below.

Figure 3:
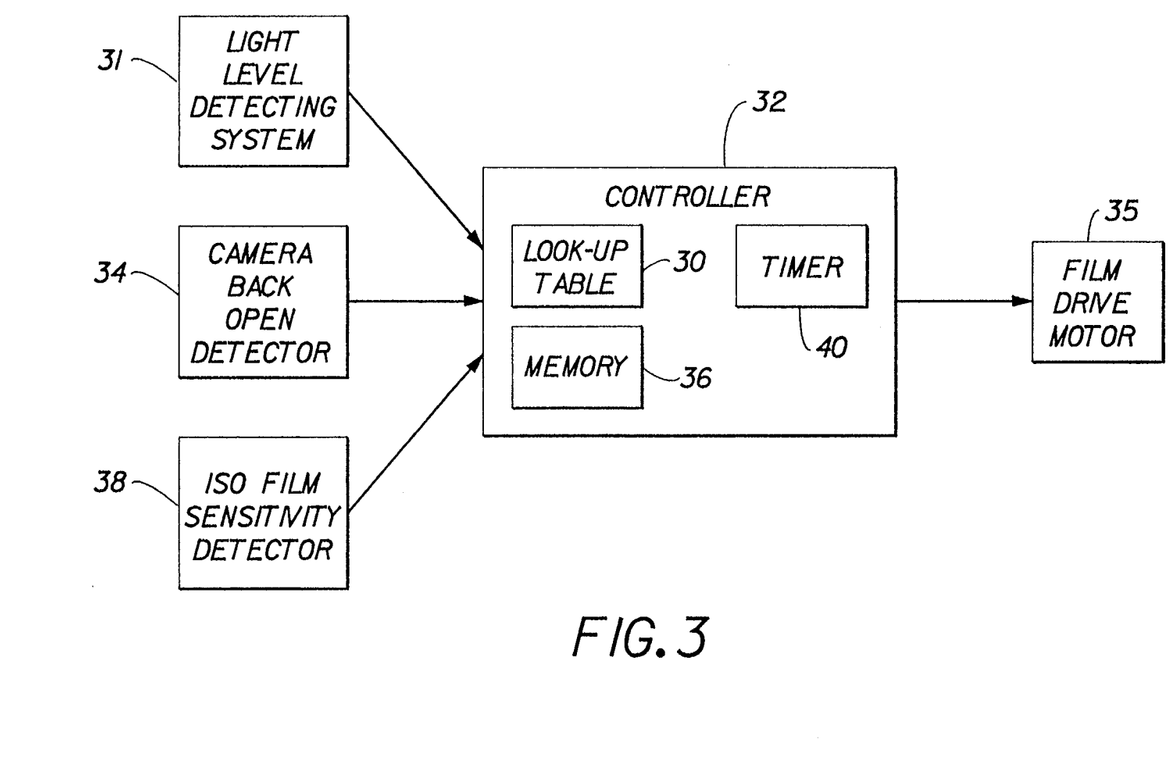
FIG. 3 is a block diagram illustrating the operation of the camera shown in FIG. 1.

With reference to the preferred embodiment illustrated in FIGS. 1 and 2, and with reference to the block diagram illustrated in FIG. 3, the number of film frames to be skipped is stored in a look-up table 30 that is indexed by detected ambient light and film sensitivity. As described further below, the table also can be indexed by the elapsed time during which the camera back was open. In the preferred embodiment, the ambient light is monitored using the light level detecting system 31 of the camera 10 and is determined to be one of several light level intervals, for example, either bright light, cloudy/subdued light, or dark. These categories can be specified from the foot-lamberts of illumination as determined by the camera light level detecting system and encompass a range of values.

Alternatively, the camera 10 can detect the ambient light level, for purposes of bypassing fogged frames, by using a dedicated sensor. For example, a light sensor can be placed on the inside surface of the camera back 14 or near the exposure gate 18. A light sensor at one of these locations would be more accurate in sensing the light level reaching the film 17 when the camera back 14 is opened than a light sensor on the front of the camera.

In the preferred embodiment, the number of film frames that were fogged when the camera back of a camera was momentarily opened in mid-roll when loaded with ISO 100 and ISO 400 print film was experimentally determined, where bright light was defined to be an illumination of approximately 1900 foot-lamberts, subdued light was defined to be an illumination of approximately 525 foot-lamberts, and darkness was defined to be an illumination of approximately 12 foot-lamberts. It is to be understood that a range of illumination values would be used to specify the light level intervals and that intervals and specifications other than those of the preferred embodiment can be used. The experimental data obtained for the ISO 100 and ISO 400 print film was used to construct the following table of film frames fogged by exposure to the defined light categories for a range of film speed:

|         | Bright | Cloudy | Dark |
|---------|--------|--------|------|
| ISO 25  | 8      | 6      | 4    |
| ISO 64  | 8      | 6      | 4    |
| ISO 100 | 10     | 8      | 6    |
| ISO 200 | 10     | 8      | 6    |
| ISO 400 | 10     | 8      | 6    |

The table entries above were obtained assuming that the camera back was held open only momentarily, on the order of 0.5 second to 1.0 second.

In the camera 10 of FIGS. 1 and 2, the table entries above are stored in the look-up table 30, which is part of a camera controller unit 32. Alternatively, the predetermined number of film frames to be skipped can be set to a single constant number for all film speeds. As can be seen from the table above, however, a constant number of frames to be skipped will not provide maximum benefits in saving otherwise discarded film frames and therefore is not preferred. Yet another alternative is to provide the controller 32 with an algorithm for calculating the number of frames to be skipped based on the parameters used to retrieve an entry from the look-up table 30. If the controller is provided with such an algorithm, then it is not necessary to provide the camera with the look-up table.

The above-described film skipping operations are initiated with the opening of the camera back 14. Therefore, as illustrated in FIG. 3, the camera 10 includes a camera-back-open detector 34 that detects when the camera back is opened and film is loaded in the camera. If the opening of the camera back occurs during the picture-taking mode, then the detector provides a signal to the controller, which initiates frame skipping by providing appropriate drive signals to a film drive motor 35. If the opening of the camera back occurs during the pre-wind mode, then the detector 34 can be used to store frame counts, corresponding to detected instances of opening and closing of the camera back, in a frame count memory 36. After the pre-wind mode is completed, these frame counts can be retrieved during the picture-taking mode to skip fogged frames, as described above.

Selecting the proper number of frames to be skipped from the data table requires knowledge of the film sensitivity to light. Therefore, the camera 10 of the preferred embodiment includes a film sensitivity detector 38 that determines the filmstrip ISO rating by DX-code contacts. This information is used to select the proper data table entries. Alternatively, the film sensitivity can be provided by the camera user via an ISO switch.

The number of frames fogged when the camera back 14 is opened varies not only with the amount of ambient light and the film sensitivity to light, but also varies with the amount of time the camera back is left open. Therefore, the number of frames to be skipped during the picture-taking mode can be adjusted by considering the elapsed time during which the camera back was left open.

In the case of opening the camera back during the picture-taking mode, the elapsed time can be detected by providing the camera 10 with a timer 40 that receives signals from the camera-back-open detector 34 on opening and closing. In the case of opening during the pre-wind mode, the elapsed time can be detected with the timer or can be derived by considering the frame count at the time the camera back was opened and at the time the back was closed. Because the approximate pre-wind travel speed of the filmstrip 17 is known, the approximate elapsed time of the open back condition can be calculated from the number of frames wound. In either case, the predetermined number of frames to be skipped that is retrieved from the look-up table 30 or calculated by the controller 32 can be adjusted to account for the elapsed time of the open back condition, thereby more accurately determining the likely number of frames fogged during the time the camera back was open.

These techniques can more accurately estimate the number of frames likely to have been fogged. For example, during the pre-wind mode, if the camera back 14 is opened when the frame counter 20 is at fourteen and is closed when the frame counter is at twenty-four, and if the corresponding table entry for the film speed and ambient light is six frames, then frames eight through twenty-four would be skipped during the picture-taking mode. Likewise, the number of frames to be skipped during the picture-taking mode can be adjusted. For example, if the camera back is open when the frame count is fourteen (that is, fourteen frames remain unexposed on the filmstrip), if the corresponding table entry is six frames, and if the camera back is closed after five seconds have elapsed, then the number of frames to be skipped as indicated by the table could be adjusted so that the actual number of frames to be skipped is eight, or some other value as determined experimentally.

Figure 4:
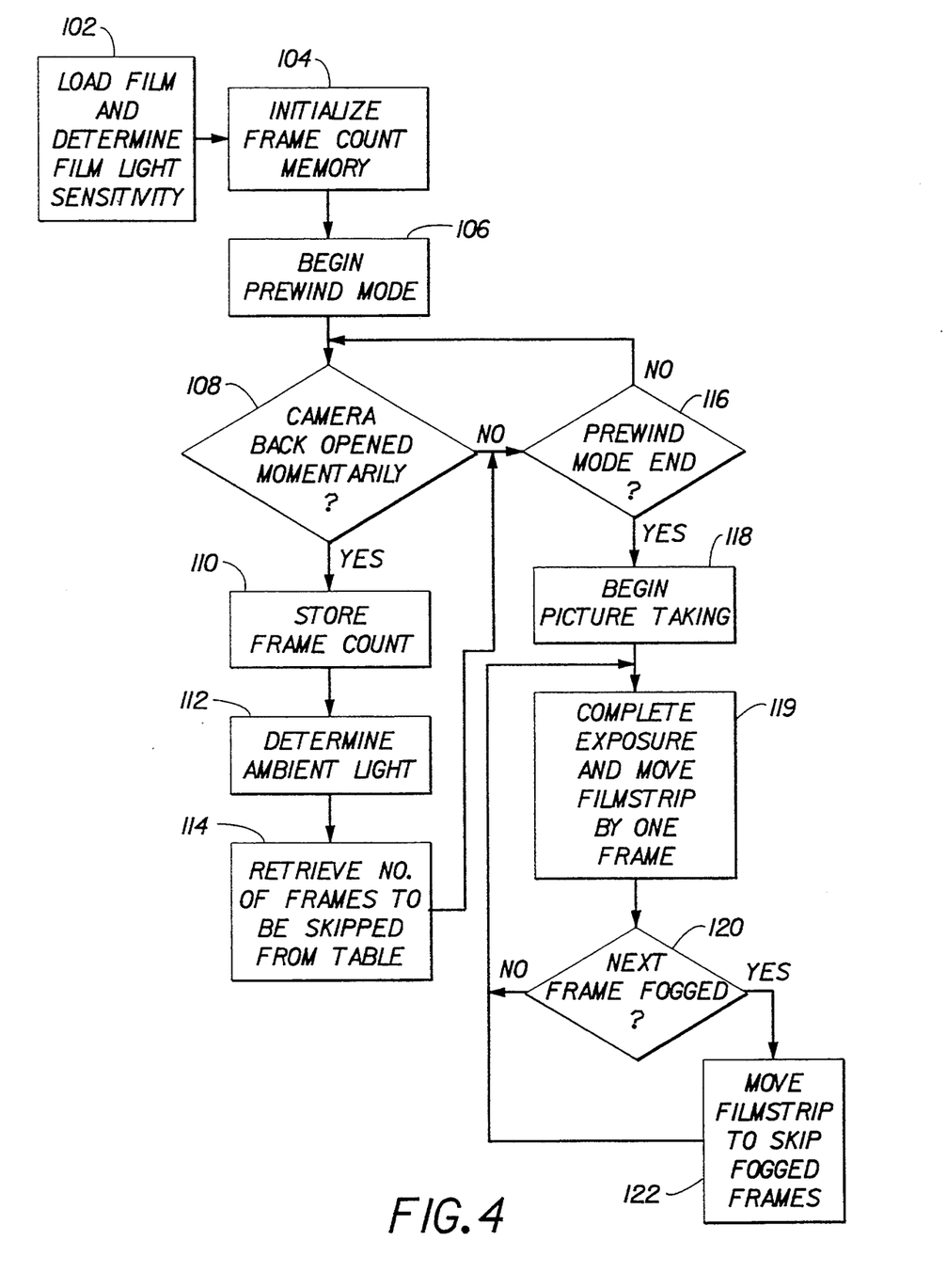
FIG. 4 is a flowchart illustrating the operation of the camera shown in FIG. 1.

The sequence of operations carried out by a camera constructed in accordance with the present invention can be understood better with reference to the flow chart of FIG. 4, which illustrates the operation of a pre-wind camera that automatically skips fogged frames of the filmstrip. After a film canister is loaded and film sensitivity is determined at step 102 and after the frame count is initialized at step 104, the camera begins the pre-wind mode at step 106, during which substantially the entire roll of film is wound from the film canister onto a take-up spool while frames are counted. If the camera detects that the camera back is opened momentarily during pre-winding at step 108, the camera responds by halting the winding of film and storing the frame count at the time of opening at step 110 and determining the ambient light at step 112. The ambient light and film speed are used to retrieve an appropriate number from a look-up table at step 114 that indicates the number of frames likely to have been fogged by the opening of the camera back. The frame counter number and fogged frame number can be stored. The pre-wind mode is completed at step 116.

Once the picture-taking mode has begun at step 118, the frame count is decreased by one as each frame exposure is completed and the film is rewound into the film canister by one frame so that the next unused frame is located at the exposure gate (step 119). After the completion of each exposure, the controller checks at step 120 to see if the next frame is fogged by checking to see if the frame number of the next frame to be exposed is equal to the stored frame count number from the pre-wind mode. If the number of the frame to be exposed is equal to the stored frame count, then at step 122 the controller causes the film drive motor to rewind the film and skip a number of film frames equal to the number retrieved from the look-up table before the shutter button can be pressed and cause an exposure. The exposure can then be completed at step 119. If the frame count is not equal to the stored count at step 120, then an unused and unfogged frame is located at the exposure gate and therefore there is no need to move the filmstrip. It is to be understood that the camera 10 checks for an end-of-roll condition after each exposure at step 119 as part of the normal camera operation. The response of the camera 10 to the opening of the camera back 14 during the picture-taking mode is described further below.

In another embodiment of a pre-wind camera constructed in accordance with the invention, the elapsed time during which the camera back is open during both the pre-wind mode and the picture taking mode changes the number of frames skipped. The sequence of operations for such a camera will be better understood with reference to the flowchart illustrated in FIGS. 5 and 6. As noted above, the camera 10 includes a camera-back-open detector 34 that is used to indicate the extent of time during which the camera back 14 is held open. A film canister 16 is loaded and film sensitivity to light is determined at step 202 and the frame count and timer are initialized at step 204 before the beginning of the pre-wind mode at step 206. The controller 32 checks for the opening of the camera back at step 208. If the camera back is not opened, then the controller checks at step 210 for the end of the pre-wind mode. If the pre-wind mode is not completed, then the controller continues with winding onto the take-up spool frame-by-frame at step 211. If the camera back is opened, the FIG. 5 embodiment stores a beginning-frame-count in the controller memory 36 (FIG. 3) and initializes a timer 40 at step 212. At step 214, the controller 32 checks to see if the camera back 14 is closed. If the camera back is not closed, the pre-wind mode continues at step 216 and the frame count and timer are updated accordingly. When the camera back is closed, at step 218 the controller 32 receives (1) the frame count at the time of the closing as the ending-frame-count, (2) the elapsed time, and (3) the ambient light, and stores these values in the controller memory 36.

Figure 5:
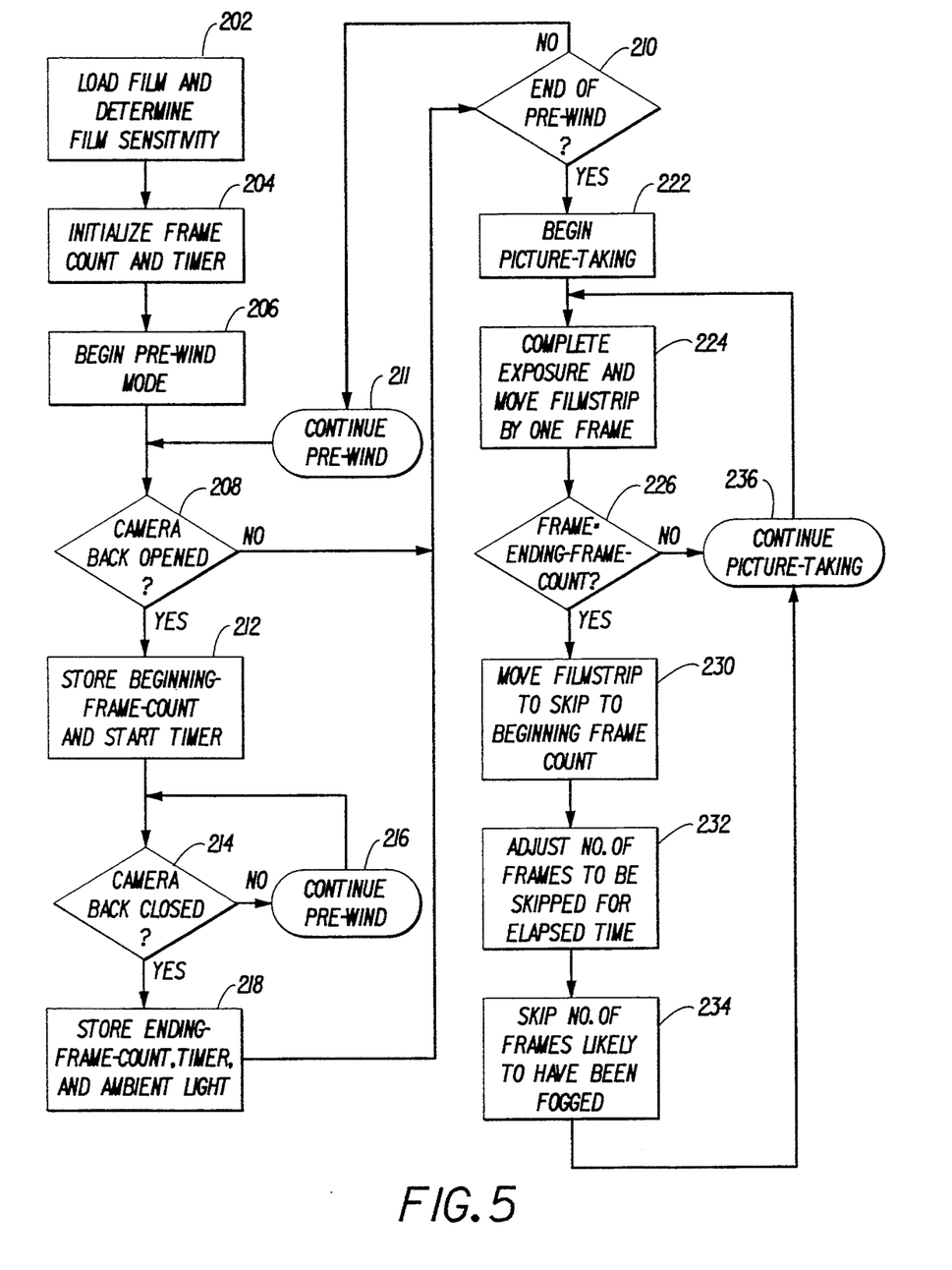
FIG. 5 is a flowchart illustrating the operation of a second embodiment of a camera constructed in accordance with the present invention.

After the data associated with the opening of the camera back 14 is stored, at step 210 the controller 32 checks for the end of the pre-wind mode. If the pre-wind mode is not completed, the film is moved and the pre-wind mode is continued at step 211. When the pre-wind mode is completed (an affirmative answer at step 210), the picture taking mode begins at step 222.

After each exposure is completed (step 224) during the picture-taking mode, the frame count is decreased by one and the filmstrip is rewound into the film canister 16 so that the next unused frame is located at the exposure gate 18. After the completion of each exposure, the controller 32 checks at step 226 to see if the frame count indicates that the next frame to be exposed corresponds to a frame that is to be skipped. That is, the controller checks to see if the next frame number is equal to the ending-frame-count number associated with a camera back opening, because that frame number will be the first fogged frame encountered as the filmstrip is moved during the picture-taking mode.

If the next frame is not fogged, then the picture-taking mode is continued at step 228. If the next frame number is equal to the ending frame count, then at step 230 the controller commands the film drive motor to skip a number of frames such that the next frame number is equal to the beginning-frame-count number. Thus, in the example of a camera back that was opened during pre-wind from the time the frame counter indicated frame fourteen until the time it indicated frame twenty-four, the first frame encountered during the picture-taking mode would be frame twenty-four and the controller would cause the film to be skipped to frame fourteen. This places the film approximately where it was at the time the camera back 14 was opened and the last portion of the filmstrip 17 was being exposed to ambient light.

The FIG. 5 embodiment adjusts the number of frames to be skipped in consideration of the time the camera back 14 was opened. Therefore, at step 232, the controller adjusts the number of frames to be skipped, for example, by adding additional frames for each interval of time, such as one second, for which the camera back was open. For example, in the example above, the number of frames to be skipped beyond frame fourteen might be six, to account for the portion of the filmstrip edges that were exposed to ambient light and were not protected by wraps of film. Accordingly, the filmstrip would be rewound to frame eight rather than frame fourteen. The adjustment number can be incorporated into the look-up table or can be an offset that is a function of the back door open time.

The adjustment to the number of frames to be skipped also can vary according to the sensitivity of the filmstrip to light. For example, if the film ISO rating is 1600 and the look-up table 30 contains data only for ISO ratings up to 400, then the controller can increase the number of frames to be skipped accordingly. In this way, the number of frames to be skipped is determined so as to increase the likelihood that the number of frames skipped is equal to the number of frames likely to have been fogged (step 234) and to increase the likelihood that the next frame of the filmstrip 17 located at the exposure gate is an unused, unfogged frame. Normal operation of the picture-taking mode is then continued at step 236. Thus, the number of frames bypassed is minimized and the number of frames saved is maximized. As noted previously, it is to be understood that the camera checks for an end-of-roll condition after each exposure (step 224) as part of the normal camera operation.

Figure 6:
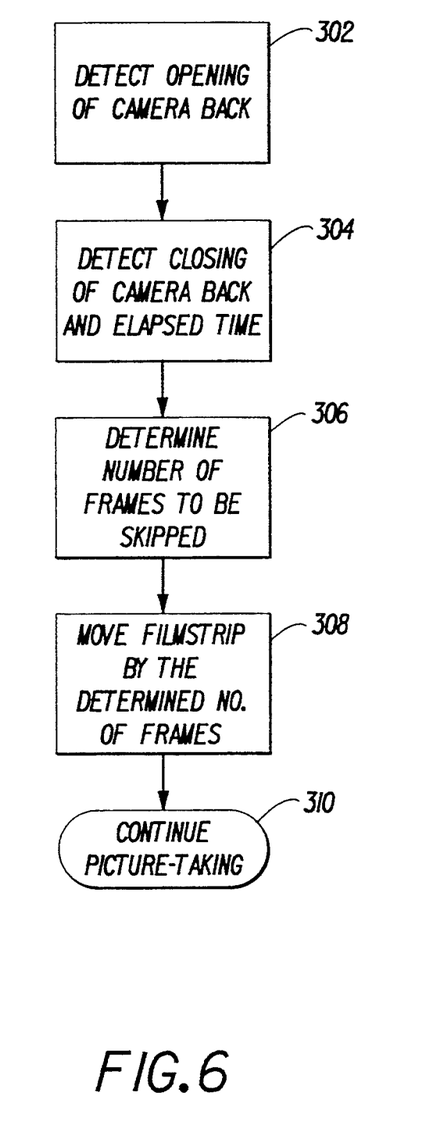
FIG. 6 is a flowchart illustrating the operation of a camera constructed in accordance with the present invention.

Finally, FIG. 6 illustrates the sequence of operations for skipping frames when the camera back 14 is opened during the picture-taking mode. The opening of the camera back is detected by a camera-back-open detector at step 302. In the preferred embodiment, the camera includes a timer that determines the elapsed time during which the camera back was opened (step 304). In response to the opening and closing of the camera back, the camera controller retrieves the number of frames to be skipped from a look-up table at step 306. Alternatively, the controller can use a stored algorithm that calculates the number of frames to be skipped depending on skipping parameters. In the case of a pre-wind camera, as described above, the number of frames skipped can depend on parameters such as the amount of ambient light and the film sensitivity to light, and further can depend on the amount of elapsed time during which the camera back was open. After determining the appropriate number of frames to be skipped, the pre-wind camera controller commands the film drive motor 35 to re-wind the appropriate number of frames back into the film canister 16 at step 308. The picture-taking mode then continues at step 310.

In the case of a conventional-wind camera, the controller can respond to the opening of the camera back in mid-roll (step 302) by selecting a predetermined number of frames, such as two (step 306) and advancing the filmstrip 17 (step 306). Because the unused portion of the filmstrip in a conventional-wind camera is kept in the light-tight film canister 16, the conventional-wind camera can advance the filmstrip by an unchanging number of frames. Thus, the step of detecting the closing of the camera back (step 304) is necessary only to trigger the advancement of the filmstrip, and not to determine the number of frames to be advanced. In this way, a conventional-wind camera provides an unused, unfogged frame at the exposure gate after the opening of the camera back in mid-roll by advancing the filmstrip so the frames located between the exposure gate and the film canister at the time the camera back was opened are moved beyond the exposure gate after the camera back is closed.

Other alternatives to the described embodiments will occur to those skilled in the art. For example, the number of frames to be advanced can be determined according to an algorithm, rather than according to a number retrieved from a look-up table. The algorithm can take into account the film sensitivity, time the camera back was left open, and detected ambient light.

The present invention has been described above in terms of presently preferred embodiments so that an understanding of the present invention can be conveyed. There are, however, many configurations for film advancement systems not specifically described herein, but with which the present invention is applicable. The present invention should therefore not be seen as limited to the particular embodiments described herein, but rather, it should be understood that the present invention has wide applicability with respect to film advancement systems in a variety of applications. All modifications, variations, or equivalent arrangements that are within the scope of the attached claims should therefore be considered to be within the scope of the invention.

I claim:

1. A method of skipping frames of a photographic film strip in a pre-wind camera that includes a pre-wind mode of operation and a picture-taking mode of operation after frames have been fogged by opening of the camera back, comprising the steps of:
   detecting when the camera back is opened;
   skipping a number of frames of the filmstrip corresponding to said fogged frames, the number of frames to be skipped being determined as a function of ambient light and the filmstrip sensitivity to light, by rewinding the filmstrip into a light-tight film canister by the determined number of frames during the picture-taking mode of operation; and
   resuming camera picture-taking operation.

2. A method as defined in claim 1, wherein the number of frames to be skipped is also determined as a function of the elapsed time during which the camera back was open.

3. A method of bypassing inadvertently fogged film in a photographic camera that loads film in a pre-wind mode, during which an entire roll of film is wound from a film canister onto a take-up spool while frames are counted, and completes exposures in a picture taking mode, during which film is rewound off the take-up spool frame-by-frame into the film canister as exposures are completed, the method comprising the steps of:
   detecting when the camera back is opened during the pre-wind mode;
   storing data concerning film frames fogged by the opening of the camera back;
   completing the pre-wind mode;
   beginning the picture taking mode;
   counting frames as they are exposed;
   comparing the stored data and detecting when the frame count indicates that the next frame to be exposed during the picture-taking mode is a fogged film frame;
   advancing the film into the film canister beyond the fogged film frame by a predetermined number; and
   continuing to complete exposures.

4. The method as defined in claim 3, wherein the step of advancing the film includes detecting the filmstrip sensitivity to light and adjusting the predetermined number of frames to be advanced in accordance with the film sensitivity.

5. The method as defined in claim 4, wherein the step of adjusting the predetermined number of frames to be advanced includes retrieving the predetermined number from a look-up table.

6. The method as defined in claim 4, further including the step of determining the amount of time the camera back is opened; and wherein the step of adjusting the number of frames to be advanced includes compensating for the amount of time the camera back was open during the pre-wind mode.

7. The method as defined in claim 4, wherein the step of detecting when the camera back is opened includes the step of halting the winding of the film onto the take-up spool.

8. The method as defined in claim 3, wherein the step of advancing the film includes detecting the ambient light conditions and adjusting the predetermined number of frames to be advanced in accordance with the ambient light conditions.

9. The method as defined in claim 8, wherein the detected ambient light conditions include a plurality of light level intervals, and the number of frames to be skipped is adjusted as the ambient light conditions are changed.

10. The method as defined in claim 4, further including the step of detecting when the camera back is closed after being opened during the pre-wind mode; and wherein the step of advancing the film includes adjusting the number of frames to be advanced by detecting a beginning frame number corresponding to the frame count when the camera back was opened and detecting an ending frame number corresponding to when the camera back was closed and including the predetermined number in the number of frames to be advanced.

11. The method as defined in claim 10, wherein the step of advancing the film further includes detecting the filmstrip sensitivity to light and adjusting the predetermined number of frames to be advanced in accordance with the sensitivity.

12. A pre-wind photographic camera that accepts a film canister, which is loaded within the camera after the camera back is shut, and that winds film from the film canister onto a take-up spool during a pre-wind mode and then re-winds the film into the film canister frame-by-frame during a picture taking mode as exposures are taken, the camera comprising:

an ambient light sensor that detects ambient scene illumination received by the camera;

a film speed indicator that determines the speed of the film loaded in the camera;

a frame counter that counts the number of film frames that are wound onto the take-up spool during the pre-wind mode;

a camera-back-open detector that detects when the camera back is opened;

an open-back frame count memory that stores the frame count when the camera-back-open detector detects the opening of the camera back during the pre-wind mode; and a controller that compares the frame count during the picture taking mode and, when the frame count is equal to the value stored in the frame count memory, retrieves the number of film frames likely to have been fogged from the look-up table and advances the film by that number of frames prior to permitting an exposure to be completed.

13. The camera as defined in claim 12, further including:

a look-up table that contains data indicating the number of film frames likely to have been fogged due to opening of the camera back as a function of ambient light and film speed.

14. The camera as defined in claim 12, wherein:

the camera-back-open detector also detects when the camera back is closed after being opened and the camera further includes a closed-back frame count memory that stores the frame count when the camera-back-open detector detects the closing of the camera back during the pre-wind mode; and wherein:

the controller compares the frame count during the picture taking mode and, when the frame count is equal to the value stored in the closed-back frame count memory, retrieves the number of film frames likely to have been fogged from the look-up table, adjusts the value stored in the open-back frame count memory by the retrieved number, and advances the film until the frame count is equal to the adjusted value prior to permitting an exposure to be completed.

* * * * *